United States Patent
Powers et al.

(10) Patent No.: US 7,463,961 B2
(45) Date of Patent: Dec. 9, 2008

(54) METHOD FOR ADAPTING LOCKOUT OF NAVIGATION AND AUDIO SYSTEM FUNCTIONS WHILE DRIVING

(75) Inventors: Robert B. Powers, Ortonville, MI (US); Charles A. Massoll, Milford, MI (US); David E Bojanowski, Clarkston, MI (US); Richard A. Young, Troy, MI (US); Linda S. Angell, Grosse Point Farms, MI (US)

(73) Assignee: General Motors Corporation, Detroit, MI (US)

( * ) Notice: Subject to any disclaimer, the term of this patent is extended or adjusted under 35 U.S.C. 154(b) by 534 days.

(21) Appl. No.: 11/171,846

(22) Filed: Jun. 30, 2005

(65) Prior Publication Data

US 2007/0002032 A1  Jan. 4, 2007

(51) Int. Cl.
*G06F 7/00* (2006.01)
*G09G 5/00* (2006.01)

(52) U.S. Cl. .................................. 701/36; 345/204
(58) Field of Classification Search .................. 701/1, 701/36; 713/182–184; 235/379, 380; 345/204
See application file for complete search history.

(56) References Cited

U.S. PATENT DOCUMENTS 5,146,407 A   9/1992   Motohashi
5,844,497 A * 12/1998  Gray ...................... 340/5.54

\* cited by examiner

*Primary Examiner*—Yonel Beaulieu

(57) ABSTRACT

Methods and apparatus are provided for adaptively locking out a display on a vehicle device based on user interaction. A method begins by counting a number of user initiated display changes with an event counter, and timing the user initiated display changes with an event timer. The method continues by comparing the number of user initiated display changes in the event counter to an allowable number of user initiated display changes corresponding to the time in the event timer, and disabling the display for a display lockout time period if the number of user initiated display changes exceeds the allowable number of user initiated display changes.

20 Claims, 3 Drawing Sheets

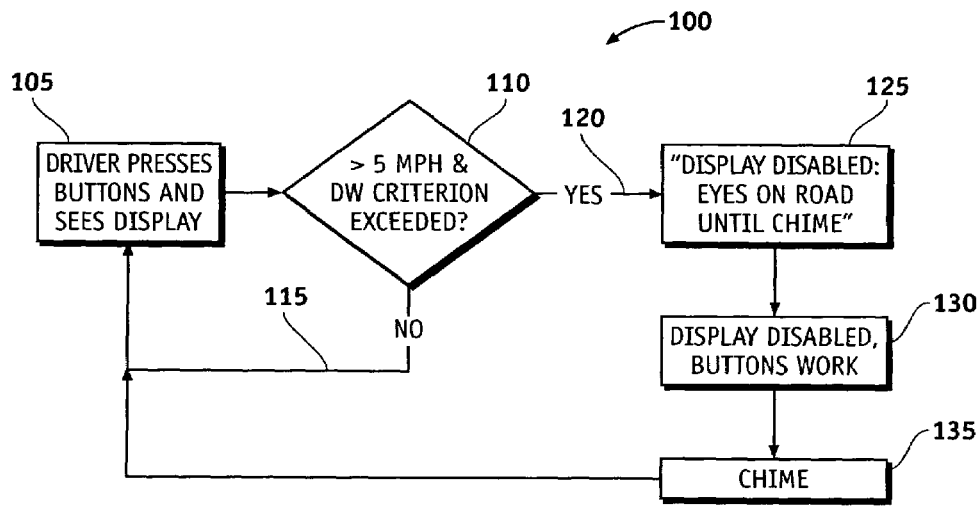

FIG. 1

| | RANGE | UNITS | DEFAULT |
|---|---|---|---|
| CALIBRATION 1-USER EVENT COUNTER Number of allowed user initiated display changes in preset period (Cal 2). These are user-initiated events that have shown (through studies, surveys, etc.) that they cause driver viewing or glances at the radio (Nav) display. | 0-64 | COUNTS | 4 |
| CALIBRATION 2-USER EVENT TIMER Preset period that number of user initiated display changes (Cal 1) can occur. | 0-25.5 Sec. | 100mS | 16 Sec. |
| CALIBRATION 3-DISPLAY LOCKOUT TIME Time the display will be locked out from changes if Cal 1 exceeded and Time between Cal 1 events that if exceeded will reset Cal 1 count to zero. | 0-16 Sec. | 250mS | 5 Sec. |
| CALIBRATION 4-"DISPLAY LOCKOUT OVER" BEEP Beep useed to let customer know the Display Lockout Time is over. | On/Off | Binary | On |

FIG. 2

| FEATURE | LOCKOUT LEVEL |
|---|---|
| MANUAL TUNE | LEVEL 1 (LEAST RESTRICTIVE) |
| PRESET SELECTION via Faceplate/Touch Screen | LEVEL 2 |
| SEEK UP/DOWN | LEVEL 2 |
| RESTORE CATEGORIES | LEVEL 2 |
| BRIGHTNESS/CONTRAST | LEVEL 2 |
| ANY SCROLLING TEXT LIST | LEVEL 3 |
| ZOOM MAP +/- | LEVEL 3 |
| ALPHANUMERIC ADDRESS ENTRY | LEVEL 4 (NOT ALLOWED) |
| TV IMAGE | LEVEL 4 (NOT ALLOWED) |
| PHONE NUMBER ENTRY PAD | LEVEL 4 (NOT ALLOWED) |
| MOVIE VIDEO IMAGE | LEVEL 4 (NOT ALLOWED) |

INCREASED RESTRICTION

*FIG. 5*

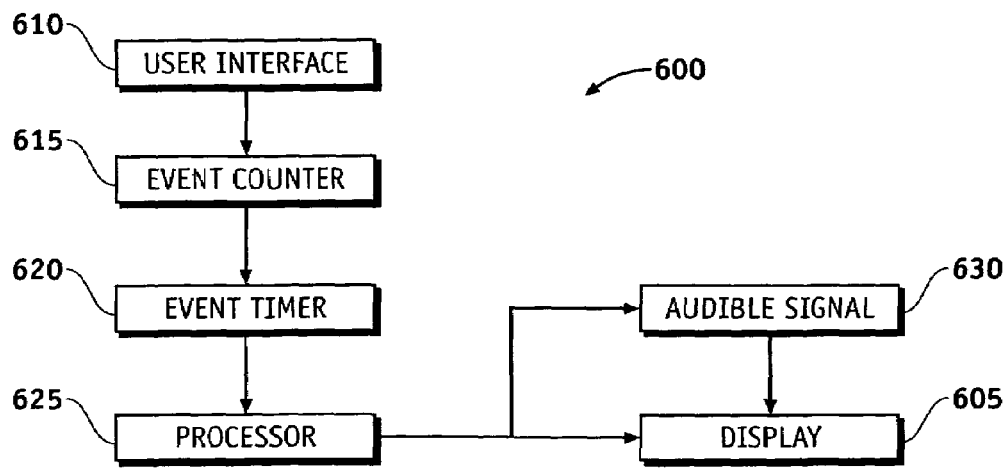

*FIG. 6*

METHOD FOR ADAPTING LOCKOUT OF NAVIGATION AND AUDIO SYSTEM FUNCTIONS WHILE DRIVING

TECHNICAL FIELD

The present invention generally relates to driver interaction with vehicle devices, and more particularly, the present invention relates to disabling a display on a vehicle device if the driver interaction is predicted to lead to excessive visual demand by the driver.

BACKGROUND

Automobiles contain many instruments and gauges that provide useful information to the driver. Traditionally, the most critical information displays are positioned in front of the driver so that with just a glance, the driver can view them. These displays included a speedometer, gas gauge, temperature gauge and/or any warning lights. Other "secondary" displays, such as radios and clocks, were positioned off to the side of the drivers view toward the center of the car. This position allows both the driver and passengers in the car to view the displays. The radio usually provided just a basic display to indicate which station was on, and push buttons or knobs that the driver or passengers could use to change the station.

As the electronics in automobiles become more sophisticated, the displays of these secondary devices show much more information. For example, most modern radios have much more capability that just AM or FM reception. These may include: SEEK or SCAN buttons to cycle through the radio stations; interface and control cassette, CD or MP3 changers; interface with portable electronics; or receive XM satellite stations. All of features usually include additional information displayed on the radio display. In addition, navigation systems are becoming more prevalent in automobiles, either as part of the radio or a separate unit. The navigation systems include a monitor that can display a good amount of information, from displaying a simple street address to a street map for navigation.

The displays in these radios and navigation devices may draw the attention of the driver away from the road. These devices have many features and functions that the driver can be interacted with and display much information. While a quick glance at the display may be safe, continuous use or overuse of these devices may not be. One alternative is to completely lock out features and functions of these devices that are excessively demanding, or could be excessively demanding if overused. While this may be a safe alternative, it penalizes the ordinary driver who does not overuse the device. The other alternative is for not locking out any features and functions, which may increase risk but does not penalize the driver. Neither of these are desired or acceptable alternatives.

Accordingly, it is desirable to provide an adaptive method and system that allows ordinary drivers to access features and functions they would normally use, but not allow the use of features and functions that would lead to excessive visual demand by the driver. Furthermore, other desirable features and characteristics of the present invention will become apparent from the subsequent detailed description and the appended claims, taken in conjunction with the accompanying drawings and the foregoing technical field and background.

BRIEF SUMMARY

An adaptive display lockout system is provided for disabling a display on a device. The system monitors user initiated display changes on a device having a display and one or more inputs. The system then compares the user initiated display changes to a display lockout criterion. If the user initiated display changes meets or exceeds the display lockout criteria, the system is capable of temporarily disabling the display.

A method is provided for adaptively locking out a display on a vehicle device based on user interaction. The method includes counting the number of user initiated display changes on the vehicle device with an event counter. The number of user initiated display changes are then timed with an event timer. The event counter and event timer information is then compared to a display lockout criterion. If the event counter and event timer information meets or exceeds the display lockout criteria, the display is disabled for a display lockout time period.

An apparatus is provided for a vehicle audio/visual device capable of adaptively locking out a display based on user interaction. The apparatus comprises one or more user input means on the device to initiate display changes, an event counter configured to count the number of user initiated display changes with the user input means and an event timer configured to measure a time period for the number of user initiated display changes. A processor is configured to disable the display for a display lockout time period if the number user initiated display changes in the measured time period exceeds an allowed number user initiated display changes in a preset time period.

BRIEF DESCRIPTION OF THE DRAWINGS

The present invention will hereinafter be described in conjunction with the following drawing figures, wherein like numerals denote like elements, and FIG. 1 shows a flow chart of one embodiment of an adaptive display lockout system;

FIG. 2 shows one embodiment of software calibrations;

FIG. 5 shows one embodiment of a Feature Control Table; and

FIG. 6 shows a simplified schematic representation of an adaptive display lockout system.

DETAILED DESCRIPTION

Figures 3, 4:
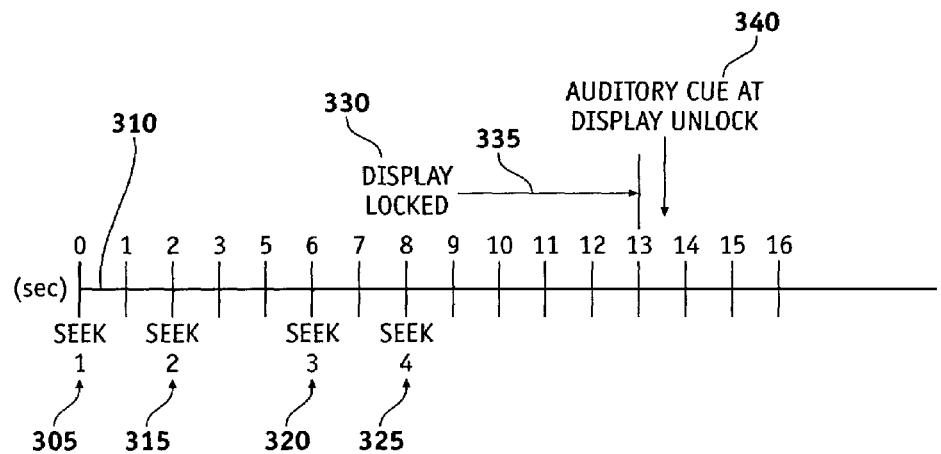
FIG. 3 shows one example of processing for an adaptive display lockout system.
FIG. 4 shows one embodiment of a Calibration Table.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control.

In addition, the materials, methods, and examples are illustrative only and not intended to be limiting.

The present invention will be described with examples in relation to particular vehicle systems and devices, but it is not intended that the invention be limited to any particular design or system. For the sake of brevity, conventional techniques related to vehicle electronics, processing, data transmission, and other functional aspects of vehicle systems (and the individual operating components of the vehicle systems) may not be described in detail herein. The vehicle system may employ a microcomputer or processor for timing and controlling device functions in accordance with an operating system. The operating system may include memory for storing a variety of programmed-in operating modes and parameter values that are used by the operating system. The memory registers may also be used for storing data compiled from device activity and/or relating to device operating history.

The present invention provides an adaptive system and method of display lockouts in response to the behavior of the driver using the device. For ordinary drivers, the system allows access to features and functions they would normally use without any display lockouts. For drivers who provide input that may lead to excessive visual demand on a display, there would be a "graceful degradation" of display services that encourages return of the eyes to the road. Thus, this system is adaptive in the sense that it does not automatically lock out all functions while driving, the functions are still available, but it is only when the driver interaction with the device becomes excessive that the system will disable the screen display.

The system and method disclosed adapts to the individual driver's behavior and encourages the driver to behave in a manner that will keep eyes-on-the-road, hands-on-the-wheel, and mind-on-the-drive. Note that this method allows the driver to continue to press buttons on the device or otherwise manipulate the user interface on the device, for example, a seek button that will continue to change FM, AM, or XM radio stations, allowing the driver to make use of the auditory information to know when to select a station. In the preferred embodiment, only the visual information will not be available.

Although there a certain individual drivers who do not "like" display lockouts, the present invention will minimize dissatisfaction with such lockouts in a manner that will allow for improvements in driver performance compared to unfettered driver access to features and functions that might otherwise exceed driver performance criteria. It is expected that the driver will rapidly learn what activity is leading to excessive display demands after the gentle reminders by the system, and will quickly learn how to improve their performance with the system to avoid display lockouts. Thus, the system uses a rather ingenious idea of using driver dissatisfaction with display lockouts to train them to improve their interaction with the system. As a result, the system is able to offer safety and security to the driver, as well as meeting the driver needs and wants for higher information, communication and navigation content in their vehicles.

FIG. 1 shows a flow chart of one embodiment of a process 100 that may be performed by an adaptive display lockout system that provides display lockouts that temporarily disables the display when a threshold display lockout criteria is met. The display lockout criteria may include (1) vehicle speed >5 mph and (2) predicted eyes-off-road-time exceeds driver workload (DW) criterion. At step 105, the driver interacts with a device by pressing one or more inputs on the device that changes the display, such as buttons on a radio or navigation system. The interactions are monitored by the system (step 110) to count the amount of interactions with the device, e.g., number of buttons pressed, and predict how much information will be displayed. The system compares the interactions and display information with the display lockout criteria to determine if the eyes-off-road time is predicted to exceed the driver workload requirements. In the example embodiment, the system performs two tests during step 110—the system tests whether the current vehicle is greater than five miles per hour; and whether the specified DW criterion has been exceeded. The speed threshold of five miles per hour is merely an example; the threshold may be used to prevent feature lockout at very low speeds. Assuming that the vehicle is traveling faster than five miles per hour, if the interactions do not meet the display lockout criteria (step 115), there is no display lockout and the adaptive system allows display changes in response to pressing of the buttons. If the adaptive system determines that the display lockout criteria has been met (step 120), the display is disabled or locked out from responding to pressed buttons for a timed interval or display lockout time period (step 125). During the display lockout time period, the buttons continue to function but the screen does not change or update in response to button presses (step 130). After the display lockout time period is finished, an auditory cue is sounded (step 135), such as a chime or beep, notifying the driver the display has returned to full functionality.

During the display lockout time period, the display may remain blank or a warning message may by put on the display for viewing by the driver. The use of a warning message informing the driver that the display is not available will encourage the driver to return their eyes to the road. There are many messages that may be displayed and the present invention applies to any such message that informs the driver that the display screen is not available.

For example, the messages may include such text as "Display Disabled—Eyes on Road until Chime", "Display Not Available Until Chime", "Return Eyes To Road Until Chime", etc. The exact auditory cue that is used has several alternatives—it could be a "beep," a "chime," etc. The present invention applies to any such auditory cue that is used to signal that the display screen is available at the end of the display lockout time.

A set of software calibrations may be used that allows for flexible settings of the adaptive display lockout system, dependent upon vehicle speed, 10 driver input, and type of viewable display screens to make sure eyes-off-road time does not exceed driver workload (DW) requirements. The software calibrations may be programmed into the system at time of production. The software calibrations may also be update periodically, such as when the car is serviced, or can even be downloaded wirelessly into the system via conventional wireless technology known in the art.

In one embodiment shown in FIG. 2, the software calibrations 200 include: (1) User Event Counter 205 (Number of Button Presses); (2) User Event Timer 210 (Task Time); (3) Display Lockout Time 215; and (4) "Display Lockout Over" Chime 220 (auditory cue). Each calibration will have a range 225, and a default setting 230. The User Event Counter 205 is the number of allowed user initiated display changes in a preset time period. These are user initiated events that have shown that they cause driver viewing or glances at the display. In the embodiment shown, the User Event Counter 205 may range from 0 and 64 counts, with a default setting of 4 counts. The User Event Timer 210 is the preset time period that the number of user initiated display changes can occur. The User Event Timer 210 may range from 0 to 25.5 seconds, with a default setting of 16 seconds. The Display Lockout Time 215 is the time that the display with be disabled if the allowed number of user initiated display changes are exceeded in the preset time period. The Display Lockout Time 215 may range from 0 to 16 seconds, with a default setting of 5 seconds. The "Display Lockout Over" Chime 220 is used to let the driver know that the display lockout time is over and that the display can now be viewed.

Another embodiment of the adaptive display lockout system can be used with excessive paging of information on the display screen, for example, categories of XM stations, folders of MP3 songs, or address book entries. When more than 2 or 3 pages of such lists of items are attempted to be accessed in too short a time, a screen message will come on "return eyes to road until chime." It is expected that the driver will quickly learn to return their eyes to the road in such a situation, and to use the auditory cue to let them know when the display is available. The auditory cue is a unique feature, because otherwise the driver will potentially spend an excessive amount of time scanning the display area to determine when the display is available again.

FIG. 3 shows one example of processing for an adaptive display lockout system for a radio seek operation on a radio using the four software calibrations discussed above in FIG. 2. This example uses the default values of the software calibrations such that while driving, if the user initiates more than four radio seek operations in sixteen seconds the display is locked out for five seconds. When a driver pushes a button on a radio (seek 1) 305, a time period 310 is initiated on an event counter at time zero. The driver then pushes the button again (seek 2) 315 at two seconds, again at six seconds (seek 3) 320 and finally at eight seconds (seek 4) 325. At the eight second mark, the user event counter has counted four radio seek requests within sixteen seconds, thereby meeting the display lockout criteria. The display is then locked 330 for the display lockout time 335 of five seconds. The seek button will still operate but the display will not be updated with the radio information. When the display lockout period 335 has ended after five seconds, an auditory cue 340 is produced that informs the driver that the display lockout period has ended and the display then returns to normal operation. The user event counter and event counter are then reset to zero. If the driver presses the seek button at a pace that does not meet the display lockout criteria, he or she need never experience a display lockout condition of any kind.

As discussed above, software calibrations allow for flexible settings of the display lockout system. FIG. 4 shows one embodiment of a Calibration Table 400 that may be developed that allows for multiple settings for individual features and functions for "soft" lockouts in between no lockouts, and hard lockouts. For example, a five level calibration table 400 may have the following calibration levels 405:

Level 0=No Lockout (410)
Level 1=Display Disable after 7 counts/16 sec (415)
Level 2=Display Disable after 4 counts/16 sec (420)
Level 3=Display Disable after 3 counts/16 sec (425)
Level 4=lockout, function never allowed >5 mph, current "hard" lockout method (430)

FIG. 4 shows some suggested settings for the three intermediate or "soft" lockout calibrations, Levels 1-3 between Level 0 and Level 4. Each of the levels includes a User Event Timer 435, User Event Counter 440, Display Disable Time 445 and Expiration Beep 450. The User Event Timer 435 is a preset time period in which a number of user initiated display changes can occur. The User Event Counter 440 is the number of allowed user initiated display changes in the preset time period. The Display Disable Time 445 is the time period that the display with be disabled or locked if the allowed number of user initiated display changes is exceeded in the preset time period. The Expiration Beep 450 is used to let the driver know that the display lockout time is over and that the display can now be viewed.

FIG. 5 shows one embodiment of a Feature Control Table 500 that allows easy application of the lockout levels described above for the Calibration Table 400. The Feature Control Table 500 allows differing levels of lockout 505 for user interaction with individual features 510 of a device. Starting at the top, Manual Tune of a radio is a Level 1, the least restrictive level. Level 1 means that the display will be disabled if there are seven counts within sixteen seconds. The next group is Level 2, which may include Preset Selection via faceplate/touch screen, Seek up/down, Restore Categories and Brightness/Contrast. Level 2 is a little more restrictive than Level 1, in that the display will be disabled if there are four counts within sixteen seconds. Level 3 is next and may include Any Scrolling Text List and Zoom Map +/−. Level 3 disables the display if there are three counts within sixteen seconds. Finally, there is Level 4, which is not allowed while the vehicle is moving at a speed greater than 5 mph. These may include Alphanumeric Address Entry, TV Image, Phone Number Entry and Movie Video Image.

FIG. 6 shows a simplified schematic representation of a vehicle audio/visual device 600. The block elements depicted may represent logical, software, or processing elements that may be realized as software in a processor, or separate elements linked together to form the system. Block elements may also be physical elements that interface with the user.

The vehicle audio/visual device 600 is capable of adaptively locking out a display 605 based on user interaction. The user interaction is done through a user interface 610 on the vehicle audio/visual device 600 for processing user initiated display changes. The user interface 610 may include one or more buttons for input. The buttons may be physical buttons and/or "soft" buttons on a touch screen display. The vehicle audio/visual device 600 also includes an event counter 615 that is coupled to the user interface 610. The event counter 615 is used to count the number of user initiated display changes originating from the user interface 610. An event timer 620 is coupled to the event counter 615 and is configured to measure a time period for the number of user initiated display changes. A processor 625 coupled to the event timer 620 and configured to disable the display 605 for a display lockout time period if the number of user initiated display changes in the time period exceeds an allowed number of user initiated display changes in a preset time period.

The vehicle audio/visual device 600 may also include an audible signal 630 coupled to the processor 625 to indicate the end of the display lockout time period. The audible signal 630 may be a chime or beep.

As described herein, the present invention provides alternatives to the complete lockout of the features and functions that exceed driver performance criteria, or for not locking out anything, neither of which is acceptable in certain instances. This invention allows ordinary drivers access to features and functions they would use, but for drivers who try things that may lead to excessive visual demand, there will be a graceful degradation of display services, that can be turned back on after a timeout that encourages return of eyes to the road. The invention offers a middle-of-the-road alternative that can adapt to the individual driver behavior; and in fact gently encourage the driver to behave in a manner that will keep eyes-on-the-road, hands-on-the-wheel, and mind-on-the-drive.

It is expected that a driver will rapidly learn how to stay within the button rate limit and the if the button rate limit is exceeded, that the display will not be available again until a beep and there is no reason for driver to continue looking or glancing at display until beep. As long as the driver maintains a normal pace of interaction with the system or is at a low vehicle speed, he or she need never experience a display restriction While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An adaptive display lockout system, comprising:
   means for monitoring a number of user initiated display change requests for a preset time interval, wherein the user initiated display change requests are directed to a device having a display, and wherein each user initiated display change request represents a request to change visual information on the display;
   means for comparing the number of user initiated display change requests to a display lockout criteria, wherein the display lockout criteria corresponds to an allowable number of user initiated display change requests for the preset time interval; and
   means for temporarily disabling the display for a display lockout time if the number of user initiated display change requests meets the display lockout criteria.

2. The system of claim 1, wherein the display lockout criteria includes one or more software calibrations.

3. The system of claim 2, wherein device further includes one or more inputs and each of the one or more software calibrations correspond to a display lockout level associated with each of the one or more inputs.

4. The system of claim 2, wherein each of the one or more software calibrations include a user event counter, a user event timer and a display lockout time.

5. The system of claim 4, wherein the user event counter ranges from 0 and 64.

6. The system of claim 4, wherein the user event timer ranges from 0 to 25.5 seconds.

7. The system of claim 4, wherein the display lockout time period ranges from 0 to 16 seconds.

8. The system of claim 4, wherein each of the one or more software calibrations further includes means for signaling the end of the display lockout time period.

9. The system of claim 8, wherein means for signaling the end of the display lockout time period is an auditory cue.

10. The system of claim 1, wherein the display is blank when disabled.

11. The system of claim 1, wherein the display includes a warning message when disabled.

12. The system of claim 1, further comprising means for resuming the display.

13. A method of adaptively locking out a display on a vehicle device based on user interaction, comprising:
    counting a number of user initiated display changes with an event counter;
    timing the user initiated display changes with an event timer;
    comparing the number of user initiated display changes in the event counter to an allowable number of user initiated display changes corresponding to the time in the event timer; and
    disabling the display for a display lockout time period if the number of user initiated display changes exceeds the allowable number of user initiated display changes.

14. The method of claim 13, wherein the display lockout criteria includes a number of allowed user initiated display changes in a preset time period.

15. The method of claim 13, further comprising signaling the end of the display lockout time period.

16. The method of claim 15, wherein the signaling the end of the display lockout time period is an auditory cue.

17. The method of claim 13, further comprising informing the user that the display is not available during the display lockout time period.

18. A vehicle audio/visual device capable of adaptively locking out a display based on user interaction, comprising:
    a user interface on the device for processing user initiated display changes;
    an event counter coupled to the user interface and configured to count a number of user initiated display changes originating from the user interface;
    an event timer coupled to the event counter and configured to measure a time period for the number of user initiated display changes; and
    a processor coupled to the event timer and the event counter, the processor being configured to:
       compare the number of user initiated display changes in the event counter to an allowed number of user initiated display changes corresponding to the time in the event timer; and
       disable the display for a display lockout time period if the number of user initiated display changes in the time period exceeds the allowed number of user initiated display changes.

19. The device of claim 18, further comprising an audible signal configured to indicate the end of the display lockout time period.

20. The device of claim 18, wherein the display lockout time period ranges from 0 to 16 seconds.

* * * * *